(12) United States Patent
Kochem et al.

(10) Patent No.: US 6,537,652 B1
(45) Date of Patent: Mar. 25, 2003

(54) BIAXIALLY ORIENTED ELECTRICAL INSULATION FILM HAVING IMPROVED SHRINKAGE AT ELEVATED TEMPERATURES

(75) Inventors: Karl-Heinz Kochem, Neuenkichen (DE); Kerstin Muller-Nagel, Nalbach-Korprich (DE)

(73) Assignee: Hoescht Trespaphan GmbH, HNeunkirchen, DE (US)

( * ) Notice: Subject to any disclaimer, the term of this patent is extended or adjusted under 35 U.S.C. 154(b) by 0 days.

(21) Appl. No.: 09/807,695

(22) PCT Filed: Oct. 26, 1999

(86) PCT No.: PCT/EP99/08090

§ 371 (c)(1),
(2), (4) Date: Jun. 12, 2001

(87) PCT Pub. No.: WO00/25330

PCT Pub. Date: May 4, 2000

(30) Foreign Application Priority Data

Oct. 28, 1998 (DE) .......................................... 198 49 678

(51) Int. Cl.$^7$ ........................... B32B 27/32; H01G 4/18; C08J 5/18

(52) U.S. Cl. ............... 428/220; 264/173.19; 264/210.7; 264/466; 428/461; 428/516; 428/910

(58) Field of Search ................................ 428/500, 516, 428/461, 910, 220, 219; 264/173.19, 210.7, 466

(56) References Cited

FOREIGN PATENT DOCUMENTS

| EP | 0498249 A | 8/1982 |
| EP | 0755779 A | 1/1997 |
| EP | 0776926 A | 6/1997 |

*Primary Examiner*—D. S. Nakarani
(74) *Attorney, Agent, or Firm*—Powell Goldstein Frazer & Murphy LLP

(57) ABSTRACT

A biaxially oriented polypropylene film is described. The n-heptane-insoluble content of the film has a chain isotacticity index, measured by 13-C-NMR spectroscopy, of at least 95%. In particular, the film should have the lowest possible shrinkage (transverse shrinkage and longitudinal shrinkage) at elevated temperatures. In addition, a process for the production of the polypropylene film and its use is described.

30 Claims, No Drawings

BIAXIALLY ORIENTED ELECTRICAL INSULATION FILM HAVING IMPROVED SHRINKAGE AT ELEVATED TEMPERATURES

BACKGROUND OF THE INVENTION

1. Field of the Invention

The invention relates to a polypropylene film having improved properties for use as electrical insulation film in capacitors.

2. Description of Related Art

EP-A-0 645 426 describes a biaxially oriented polypropylene film whose n-heptane-insoluble content has a chain isotacticity index, measured by C-NMR spectroscopy, of at least 95%. The base layer has essentially no resin. The modulus of elasticity of the film in the longitudinal direction is greater than 2500 N/mm$^2$. The modulus of elasticity of the film in the transverse direction is greater than 4000 N/mm$^2$. The modulus of elasticity of the film in the transverse direction is greater than 4000 N/mm$^2$. According to the object of EP-A-0 645 426, these polypropylene films have low residual shrinkage. The description contains no information on the shrinkage values.

EP-A-776 926 describes a biaxially oriented film for use in capacitors which has a total shrinkage of 1–4% in the longitudinal and transverse directions at 120° C. The film consists of a highly isotactic polypropylene and has an isotacticity of 98–99.5% and an isotactic pentad fraction of >99%. No information is given on the shrinkage behavior of the film at temperatures above 120° C.

WO 97/05634 describes a capacitor whose dielectric consists of a polypropylene film having a modulus of elasticity of greater than 1500 MPa, a melting point above 110° C. and a Vicat softening point of above 150° C. The film has, inter alia, improved shrinkage behavior in the longitudinal direction between 100° C. and 150° C. The shrinkage behavior in the transverse direction is not described.

The object of the present invention is to provide a biaxially oriented polypropylene film which contributes to improved service properties of the capacitors produced therefrom. In particular, improvement in the electrical dissipation factors and the heat resistance of the capacitors are constantly needed in the expert world.

For the production of film capacitors, the films are generally firstly metallized and then coiled. Even the metallization of the film includes heating, which the film has to withstand, i.e. there must be no dimensional changes of the film due to shrinkage during metallization.

The film is thus frequently subjected to elevated temperatures both during conversion into the metallized coil and also during use. It has been found that, in particular in the case of so-called power capacitors for high-voltage applications, extreme temperatures in local regions, so-called hot-spot temperatures, can occur locally in the interior of the capacitor due to flowing currents or discharge processes between film layers. According to available studies, temperatures significantly above 120° C. up to 140° C. are reached in places.

For the above-mentioned reasons, the heat resistance of the film is of particular importance when it is used in capacitors. In particular, the film should have the lowest possible shrinkage under the given loads due to elevated temperatures, while at the same time the other advantageous properties must not be impaired.

After production of the coil, its face sides are vapor-deposited with a metal spray, generally zinc, in order to ensure good contact between the metallized film layers and the contact wires to be applied. The present invention is based on the knowledge that shrinkage occurring during use of the capacitor due to temperature loads impairs this contact between the wire and the metallized film. The consequence is impaired dissipation factors and capacitance drift.

In particular in the case of sudden changes in the temperature, there is a risk of the contacts tearing due to dimensional changes in the coil, which are themselves caused by shrinkage. This causes a further increase in the electrical dissipation factor (tan δ); the capacitor becomes hotter ever more quickly, which in extreme cases can result in total failure of the capacitor. It has been found that the service properties of the capacitor are closely correlated with the heat resistance of the film at elevated temperatures. In particular, the electrical dissipation factor of the capacitors is improved by low shrinkage of the film at elevated temperatures.

In connection with the present invention, it has been found that longitudinal and transverse shrinkage of the film should be considered differently here. Besides low longitudinal shrinkage of the film, even greater importance is attached to transverse shrinkage, in particular, with not only the absolute shrinkage values, but also the relative temperature dependence of the transverse shrinkage in the range 120–140° C. having an effect. Surprisingly, the capacitor s exhibit improved heat resistance of the dissipation factor and improved capacitance drift with time if the transverse shrinkage in said temperature range has a particularly low increase with rising temperature.

SUMMARY OF THE INVENTION

This object formulated above is achieved in accordance with the invention by a biaxially oriented polypropylene film whose characterizing features including the fact that the shrinkage of the film at elevated temperatures is low and the transverse shrinkage curve is flatter and the dissipation factors, in particular after storage, are lower.

In accordance with the invention, the film may be single-layered, in which case it consists only of the base layer described below. In a preferred embodiment, the film has at least one top layer, if desired top layers on both sides, on its base layer.

DETAILED DESCRIPTION OF THE INVENTION

The base layer of the film generally comprises at least 95% by weight, from 99 to 100% by weight, in each case based on the base layer, of a highly isotactic propylene homopolymer described below.

This propylene homopolymer comprises from at least 98 to 100% by weight, in particular from 99 to 100% by weight, of propylene. The corresponding comonomer content of at most 2% by weight or in particular from 0 to 1 % by weight generally consists, if present, of ethylene. The data in % by weight are in each case based on the propylene homopolymer.

The propylene homopolymer of the base layer has a melting point of from 160 to 170° C., preferably from 162 to 167° C., and a melt flow index (measurement in accordance with DIN 53 735 at a load of 21.6 N and 230° C.) of from 0.5 to 10 g/10 min, preferably from 0.7 to 3.5 g/10 min. The n-heptane-soluble content of the polymer is generally from 1 to 3% by weight, preferably from 1 to 2% by weight, based on the starting polymer, corresponding to an isotactic content of from 97 to 99%, preferably from 98 to 99%. The chain isotacticity index (triad method) of the propylene homopolymer, determined by $^{13}$C-NMR spectroscopy, is from at least 95 to 99%, preferably from 95.5 to 98%. The isotactic pentad fractions, which are likewise determined from the $^{13}$C-NMR spectrum of the polymer, are in the range from 85 to 95%, preferably from 87 to 92%. The molecular weight distribution (determined by GPC) of the propylene homopolymer, expressed as the ratio of the weight average molecular weight $M_w$ to the number average molecular weight $M_n$, is generally from 2 to 8, preferably from 4 to 7. The mean molecular weight $M_w$ (weight average), determined by GPC, is in the range from 200,000 to 500,000, preferably from 250,000 to 400,000.

In view of the proposed application of the film according to the invention as capacitor film, the propylene homopolymer should have an ash content of <35 ppm, preferably from 10 to 30 ppm, and a maximum chlorine content of 5 ppm.

The shrinkage behavior of a film is determined by several factors. Crucial factors for the shrinkage are the raw materials used, the production process and the film thickness. Basically, thinner films tend toward higher shrinkage both in the longitudinal and in the transverse directions, which is connected with the different degrees of orientation of the molecular chains in very thin films. This effect is more pronounced the higher the temperature to which the film is subjected, i.e., the shrinkage, in particular the transverse shrinkage, increases to a greater extent with increasing temperature in very thin films than is the case in thicker films. Furthermore, the production process also has a significant effect. The effects of various measures on the shrinkage can therefore only be compared with one another if the process conditions, in particular stretching factors and stretching temperatures, during production are essentially unchanged.

As part of the present invention, it has been found that using the highly isotactic propylene homopolymer described above for the production of the film, the desired shrinkage properties are significantly improved. Compared with known films made from highly isotactic polypropylene, the films according to the invention made from the highly isotactic polypropylene described above exhibit significantly improved shrinkage behavior, which is reflected firstly in lower longitudinal shrinkage and simultaneously in a significantly flatter shrinkage curve (temperature dependence) for the transverse shrinkage.

As a consequence of the dependence of the shrinkage properties on the film thickness, the effects for various thickness ranges have to be considered separately. To this end, a distinction is made between three groups for the purposes of the present invention:

| range I: | film thickness 3–<4.5 μm |
| range II: | film thickness 4.5–12 μm |
| range III: | film thickness >12 μm–20 μm |

Range I:

Due to the use of the highly isotactic polypropylene according to the invention, films of <4.5 μm have a shrinkage in the longitudinal direction of a maximum of 5.5% at 120° C. or a maximum of 8% at 140° C., preferably in the range from 2 to 4.5% at 120° C. or from 4 to 7% at 140° C., and a shrinkage in the transverse direction of a maximum of 2% at 120° C. or 6.5% at 140° C., preferably in the range ≦1.5% at 120° C. or from 2 to 5.5% at 140° C.

Range II:

Due to the use of the highly isotactic polypropylene according to the invention, films of 4.5–12 μm have a shrinkage in the longitudinal direction of a maximum of 4.5% at 120° C. or a maximum of 6.5% at 140° C., preferably in the range from 1.5 to 4% at 120° C. or from 3.5 to 6% at 140° C., and a shrinkage in the transverse direction of a maximum of 1.5% at 120° C. or 5.5% at 140° C., preferably in the range ≦1.2% at 120° C. or from 1.5 to 4.5% at 140° C.

Range III:

Due to the use of the highly isotactic polypropylene according to the invention, films of >12 μm–20 μm have a shrinkage in the longitudinal direction of a maximum of 4.0% at 120° C. to a maximum of 5.5% at 140° C., preferably in the range from 1 to 3.5% at 120° C. or from 3 to 5% at 140° C., and a shrinkage in the transverse direction of a maximum of 1.5% at 120° C. or 4.5% at 140° C., preferably in the range ≦1.0% at 120° C. or from 1 to 4% at 140° C.

A further criterion which has to be satisfied in accordance with the invention, besides the maximum values for the longitudinal and transverse shrinkage, is the difference in the transverse shrinkage values at 140 and 120° C., characterized by a flatter transverse shrinkage curve. These differences, like the shrinkage values themselves, must be regarded differently depending on the film thickness:

Δ transverse shrinkage at 140° C.–transverse shrinkage at 120° C.=<3.5%   range I Δ transverse shrinkage at 140° C.–transverse shrinkage at 120° C.=<3.0%   range II Δ transverse shrinkage at 140° C.–transverse shrinkage at 120° C.=<2.5%   range III The base layer of the film according to the invention generally comprises neutralizers and stabilizers in effective amounts in each case. Additives which are conventional in the packaging-film sector, such as antiblocking agents, antistatics, lubricants and pigments, are generally not added in view of the use as capacitor film.

Stabilizers which can be employed are the conventional stabilizing compounds for ethylene, propylene and other a-olefin polymers. The amount in which they are added is from 0.05 to 2% by weight. Particularly suitable are phenolic or phosphidic stabilizers, alkali metal/alkaline earth metal stearates and/or alkali metal/alkaline earth metal carbonates. Phenolic or phosphidic stabilizers are preferred in an amount of from 0.05 to 0.6% by weight, in particular from 0.1 to 0.5% by weight, and with a molar mass of greater than 500 g/mol. Pentaerythrityl tetrakis-3-(3,5-di-tert-butyl-4-hydroxyphenyl)propionate or 1,3,5-trimethyl-2,4,6-tris-(3,5-di-tert-butyl-4-hydroxybenzyl)benzene are particularly advantageous.

Neutralizers are preferably dihydrotalcite, calcium stearate and/or calcium carbonate having a mean particle size of at most 0.7 μm, an absolute particle size of less than 10 μm and a specific surface area of at least 40 m$^2$/g. Neutralizers are generally added in an amount of from 0.001 to 0.5% by weight, preferably between 0.005 and 0.1 % by weight. The data in % by weight are in each case based on the weight of the base layer.

The polypropylene film according to the invention comprises, if desired, polypropylene top layer(s) on one or both sides, which generally comprise(s) at least 95% by weight, preferably from 99 to 100% by weight, in each case based on the top layer, of a propylene homopolymer described above.

The propylene homopolymer comprises from at least 98 to 100% by weight, in particular from 99 to 100% by weight, of propylene. The corresponding comonomer content of at most 2% by weight or from 0 to 1 % by weight generally consists, if present, of ethylene. The data in % by weight are in each case based on the propylene homopolymer. The propylene homopolymer employed in the top layer has a melting point of 140° C. or above, preferably from 150 to 170° C., preference being given to isotactic homopolypropylene having an n-heptane-soluble content of 5% by weight or less, based on the isotactic homopolypropylene. The homopolymer generally has a melt flow index of from 1.0 to 10 g/10 min, preferably from 1.5 to 5 g/10 min. If desired, the top layer comprises the highly isotactic propylene homopolymer described above for the base layer.

If desired, the neutralizers and/or stabilizers described above for the base layer may be added to the top layer(s). In a preferred embodiment, the top layers likewise contain no conventional additives, such as antiblocking agents, antistatics, lubricants and pigments, in view of the use as capacitor film.

The thickness of the top layer(s) is greater than 0.1 µm and is preferably in the range from 0.3 to 3 µm, in particular from 0.4 to 1.5 µm, where top layers on both sides may have identical or different thicknesses.

The total thickness of the polypropylene film according to the invention can vary within broad limits and depends on the intended use. It is preferably from 1 to 20 µm, preferably from 3.5 to 15 µm, where the base layer makes up from about 40 to 100% of the total film thickness.

The invention furthermore relates to a process for the production of the polypropylene film according to the invention by the coextrusion process known per se.

This process is carried out by coextruding the layer or the melt(s) corresponding to the individual layers of the film through a flat-film die, taking off the resultant film on one or more roll(s) for solidification, subsequently biaxially stretching (orienting) the film, and heat-setting and, if desired, corona- or flame-treating the biaxially stretched film on the surface layer(s) intended for metalization.

The biaxial stretching (orientation) is generally carried out successively, with preference being given to successive biaxial stretching in which stretching is carried out firstly longitudinally (in the machine direction) and then transversely (perpendicular to the machine direction). Simultaneous stretching in the longitudinal and transverse directions is basically also possible.

Firstly, as usual in the extrusion process, the polymer or the polymer mixture of the individual layers is compressed and liquefied in an extruder, where any necessary additives added may already be present in the polymer or in the polymer mixture. The melts are then forced simultaneously through a flat-film die (slot die), and the extruded, multilayer film is taken off on one or more take-off rolls, during which it cools and solidifies.

The resultant film is then stretched longitudinally and transversely to the extrusion direction, which results in orientation of the molecular chains. The longitudinal stretching is advantageously carried out with the aid of two rolls running at different speeds corresponding to the target stretching ratio, and the transverse stretching is carried out with the aid of a corresponding tenter frame. The longitudinal stretching ratios are in the range from 4.0 to 8.0, preferably from 4.5 to 6.5. The transverse stretching ratios are in the range from 6.0 to 10.0, preferably between 7 and 9.5.

The biaxial stretching of the film is followed by heat-setting (thermal treatment) thereof, during which the film is held at a temperature of from 100 to 160° C. for from about 0.1 to 10 seconds. The film is subsequently wound up in a conventional manner using a wind-up device.

It has proven particularly favorable to keep the take-off roll or rolls by means of which the extruded film is cooled and solidified at a temperature of from 30 to 120° C., preferably between 60 and 100° C., by means of a heating and cooling circuit. The increased take-off roll temperatures favor the formation of β-spherolites in the prefilm. These β-spherolites generate the process-induced surface roughness which is desired for electrical films, as described in EP-A-0497 160.

Before the prefilm cooled in this way is fed into the longitudinal stretching unit, it is usually preheated at a temperature of 110–150° C., preferably at 120–140° C. This preheating can be carried out by means of heated rolls, but basically also using other customary processes, such as, for example, IR emitters, heated air, etc.

The temperatures at which longitudinal and transverse stretching are carried out depend on the desired properties, in particular the surface roughness to be produced in the film. In general, the longitudinal stretching is carried out at from 120 to 160° C., preferably 130–160° C., and the transverse stretching at from 140 to 170° C., preferably 150–170° C.

After the biaxial stretching, one or both surface(s) of the film is (are) preferably corona- or flame-treated by one of the known methods. The treatment intensity is generally in the range from 34 to 50 mN/m, preferably from 36 to 45 mN/m.

In the case of corona treatment, an advantageous procedure is to pass the film between two conductor elements serving as electrodes, with such a high voltage, usually an alternating voltage (from about 5 to 20 kV and 5 to 30 kHz) being applied between the electrodes that spray or corona discharges are able to occur. Due to the spray or corona discharge, the air above the film surface ionizes and reacts with the molecules of the film surface, so that polar inclusions form in the essentially nonpolar polymer matrix.

For flame treatment with a polarized flame (cf. U.S. Pat. No. 4,622,237), a direct electric voltage is applied between a burner (negative pole) and a chill roll. The level of the applied voltage is from 400 to 3000 V, it is preferably in the range from 500 to 2000 V. Due to the applied voltage, the ionized atoms attain increased acceleration and hit the polymer surface with greater kinetic energy. The chemical bonds within the polymer molecule are broken more easily, and free-radical formation proceeds more quickly. The temperatures to which the polymer is subjected here are much lower than in the case of standard flame treatment without application of a voltage, which is also suitable for pretreatment of the surface.

The film according to the invention is distinguished by low shrinkage at elevated temperatures and by a flat shrinkage curve for transverse shrinkage.

The following measurement methods were used to characterize the raw materials and the films:

Melt Flow Index

The melt flow index was measured in accordance with DIN 53 735 at a load of 21.6 N and 230° C.

Melting Point

DSC measurement, maximum of the melting curve, heating rate 20° C./min.

Modulus of Elasticity

The modulus of elasticity is determined at the earliest 10 days after production in accordance with EN ISO 521-1 on a sample having a size of 15*100 mm$^2$.

Tear Strength, Elongation at Break

The tear strength and elongation at break are determined in accordance with EN ISO 521-1 on a sample having a size of 15*100 mm².

Shrinkage:

The longitudinal and transverse shrinkage values relate to the respective length elongation of the film (longitudinally $L_0$ and transversely $T_0$) before the shrinkage process. The longitudinal direction is the machine direction, and the transverse direction is defined correspondingly as the direction transverse to the machine direction. The 10*10 cm² specimen is shrunk in a fan-assisted oven at the respective temperature (100 to 140° C.) over a period of 15 minutes. The remaining length elongations of the specimen longitudinally and transversely are subsequently redetermined ($L_1$ and $T_1$). The shrinkage in % is then indicated as the difference in the measured length elongations divided by the original length $L_0$ and $T_0$ times 100.

$$\text{Longitudinal shrinkage } L_s \, [\%] = \frac{L_0 - L_1}{L_0} * 100 \, [\%]$$

$$\text{Transverse shrinkage } T_s \, [\%] = \frac{T_0 - T_1}{T_0} * 100 \, [\%]$$

This determination method for the longitudinal and transverse shrinkage corresponds to DIN 40634.

Dielectric Dissipation Factor:

The dielectric dissipation factor (tan α) is measured in accordance with VDE 0303, Part 4. The film samples are coated with aluminum on both sides by vapor deposition in a vacuum vapor deposition unit before the measurement. The size of the measurement area F (=vapor deposition-coated area) depends on the film thickness d:

for a film thickness d of $\leq 10$ μm, an area of 1 cm² for a film thickness d of $>10$ μm, an area of 5 cm²

A double determination is carried out on each sample to be tested, and the mean is formed. The samples are placed in a drying cabinet. The lower electrode plate consists of brass. The upper electrode is cylindrical and likewise consists of brass. The test voltage is 1 V. The measurement is carried out at three frequencies of 0.1 KHz, 1 KHz and 10 KHz.

Residual Ash Content:

In order to measure the residual ash content, the proportion of incombustible fillers is determined quantitatively. The residual ash content (ignition loss) is calculated from the initial weight of the sample and the ignition residue. The measurement result is indicated in ppm. A representative random sample of about 1 kg is taken from the material to be tested (granules, regrind, etc.). The material must be clean and completely dry; predrying at about 80° C. in a fan-assisted heat cabinet may be necessary. Three empty porcelain crucibles are ignited for at least 1 hour at a temperature of 650° C. in a crucible furnace and, after cooling to room temperature in a desiccator, weighed to an accuracy of 0.1 mg. The ignition is repeated until constant weight is achieved between two successive weighings. 50 g (±0.1 g) of material is then weighed into each crucible and introduced into the muffle furnace at 650° C. The temperature in the furnace is then raised to 1000° C., and ignition is carried out at this temperature for at least 1 hour. After the crucible has been cooled in the desiccator, it is weighed to an accuracy of 0.1 mg. The ash content is indicated in the unit ppm (parts per million)=mg/m³. All three crucibles are evaluated in accordance with the following formula, and the two values differing the least are combined to form a mean:

$$\text{ppm} = \frac{\text{final weight (g)}}{\text{initial weight (g)}} \times 1000000$$

Chlorine Content

The chlorine content in polyolefins is measured quantitatively by X-ray fluorescence analysis (XFA) in accordance with DIN 51 001, Part 1. A tablet is pressed from granules/powder and measured by XFA against a calibration curve. The calibration curve was drawn up with the aid of 10 calibration samples in which the chlorine content has been determined by an independent method (wet-technical). (Values for the chlorine content of below 5 ppm are not indicated numerically for accuracy reasons, indication <5 ppm).

Roughness

The roughness was determined in accordance with DIN 4762 based on DIN 4768.

Surface Tension

The surface tension was determined by the so-called ink method (DIN 53 364).

Molecular Weight Determination

The mean molar mass and the mean molar mass dispersity were determined in accordance with DIN 55 672, Part 1, by gel permeation chromatography. Instead of THF, the eluent used was orthodichlorobenzene. Since the homopolymers to be investigated are insoluble at room temperature, the entire measurement is carried out at elevated temperature (at 135° C.).

Isotactic Content

The isotactic content of the homopolymer can be characterized to an approximation by the insoluble fraction of the raw material in n-heptane. A Soxhiet extraction with boiling n-heptane is usually carried out, it being advantageous to fill the Soxhlet with a pressed disk instead of granules. The thickness of the pressed disc should not exceed 500 microns here. For quantitative determination of the n-heptane-insoluble content of the homopolymer, it is of crucial importance to ensure an adequate extraction time of from 8 to 24 hours.

The operational definition of the isotactic content $PP_{iso}$ in percent is given by the ratio of the weights of the dried n-heptane-insoluble fraction to the initial weight:

$PP_{iso}$=100×(n-heptane-insoluble fraction/initial weight)

Analysis of the dried n-heptane extract shows that this generally does not consist of pure atactic propylene homopolymer. The extraction also includes aliphatic and olefinic oligomers, in particular isotactic oligomers, and also possible additives, such as, for example, hydrogenated hydrocarbon resins and wax.

Determination of the triad-based Chain Isotacticity Index 11 (triads) and Determination of the Pentad Content Sample Preparation and Measurements From 60 to 100 mg of polypropylene are weighed into 10 mm NMR tubes. After addition of a solvent mixture comprising hexachlorobutadiene ($C_4Cl_6$) and deuterated tetrachloroethane ($C_2D_2Cl_4$), the suspension is stored at about 140° C. until a homogeneous solution has formed. The dissolution process is accelerated by stirring with a glass rod. The $^{13}$C-NMR spectrum is recorded at elevated temperature (generally 373 K) under standard measurement conditions (semiquantitatively).

Evaluation of the $^{13}$C-NMR Spectrum

In order to describe the configuration statistics (tacticity) of polypropylene, three or five monomer units are combined to form triads and pentads. In a triad, the configuration of the methyl groups of the adjacent monomer units is looked at from the point of view of the methyl group of the central recurring unit. If, on moving along the polymer chain in one direction, all three methyl groups have the same configuration, this is an mm triad.

If the configuration of the preceding and succeeding methyl group are the same, but different to the central $CH_3$ group, this is an rr triad.

Two further arrangements are possible, mr and rm. However, they cannot be distinguished, since both directions along the polymer chain are equivalent. They are combined into mr triads.

The various triads can be distinguished on the basis of their different chemical shift in the $^{13}$C-NMR spectrum.

| Range of the mm triads | approx. 20.8–approx. 22.2 ppm |
| Range of the mr triads | approx. 20.0–approx. 20.8 ppm |
| Range of the rr triads | approx. 19.2–approx. 20.0 ppm |

In order to calculate the so-called triad-based chain isotacticity index II, the intensities of the triad signals are compared:

$$II \text{ (triads)} = \frac{Imm + 0.5Imr}{Imm + Imr + Irr} * 100$$

where I mm, Imr and Irr are the integrals of the associated signal groups.

An extended way of consideration is that of the pentads; here, the configuration of five methyl groups of five adjacent monomer units is compared. Ten pentads which can be differentiated result.

| Pentads | Chemical shift in ppm |
|---|---|
| mmmm | approx. 22.2–approx. 21.25 |
| mmmr | approx. 21.25–approx. 21.1 |
| rmmr | approx. 21.1–approx. 20.8 |
| mmrr | approx. 20.8–approx. 20.5 |
| rrmr + mmrm | approx. 20.5–approx. 20.3 |
| mrmr | approx. 20.3–approx. 20.0 |
| rrrr | approx. 20.0–approx. 19.8 |
| mrrr | approx. 19.8–approx. 19.6 |
| mrrm | approx. 19.6–approx. 19.2 |

For referencing of the spectra, the signal of tetrachloroethane ($C_2D_2Cl_4$) is set at 73.81 ppm. The mmmm fraction was calculated in accordance with the following formula:

$$mmmm \text{ fraction} = \frac{Immmm}{I(\text{sum of all pentad fractions})} * 100$$

Literature:

NMR-spectroscopy and polymer microstructure by Alan E. Tonelli, 1989, VCH

The invention is now explained with reference to the following working examples:

EXAMPLE 1

A transparent, single-layer film having a total thickness of 7.8 μm was produced by extrusion followed by stepwise orientation in the longitudinal and transverse directions. The raw material had the following composition:

approx. 99.5% by weight of highly isotactic polypropylene from Borealis (name HB 300 F)
0.45% by weight of phenolic stabilizer Irganox 1010
0.0075% by weight of neutralizer Ca stearate The highly isotactic polypropylene had a chain isotacticity index, measured by $^{13}$C-NMR spectroscopy, after triad analysis of 96.25%, with 94.5% being due to the mm triads, 3.5% to the mr triad and 2.0% to the rr triad. The isotacticity determined by means of mmmm pentad was 89.9%. The highly isotactic polypropylene had a chlorine content of <5 ppm and an ash content of 20 ppm. The n-heptane-soluble content of the polypropylene was 1.7% (isotactic content PP iso 98.3%). The mean molecular weight Mn was 64,600 g/mol and Mw was 392,150 g/mol (measured by GPC), corresponding to a molecular weight distribution Mw/Mn of 6.07. The melt flow index MFI (230° C. and 2.16 kp) was 1.45 g/10 min, and the melting point was 165° C.

The production conditions in the individual process steps were as follows:

| Extrusion: | Temperatures | 250° C. |
|---|---|---|
| | Temperature of the take-off roll: | 86° C. |
| Longitudinal stretching: | Preheating temperature: | 136° C. |
| | Longitudinal stretching temperature: | 148° C. |
| | Longitudinal stretching ratio: | 5.0 |
| Transverse stretching: | Temperature: | 163° C. |
| | Transverse stretching ratio: | 9.6 |
| Setting: | Temperature: | 130° C. |
| | Convergence: | 12.5% |

The stated transverse stretching ratio is an effective value. This effective value is calculated from the final film width, reduced by twice the hem width, divided by the width of the longitudinally stretched film, likewise reduced by twice the hem width.

EXAMPLE 2

A film having a total thickness of 4.5 μm was produced as described in Example 1. The production conditions were changed as follows:

| Extrusion: | Temperatures | 257° C. |
|---|---|---|
| | Temperature of the take-off roll: | 96° C. |
| Longitudinal stretching: | Preheating temperature: | 127° C. |
| | Longitudinal stretching temperature: | 140° C. |
| | Longitudinal stretching ratio: | 4.5 |
| Transverse stretching: | Temperature: | 164° C. |
| | Transverse stretching ratio: | 9.6 |
| Setting: | Temperature: | 135° C. |
| | Convergence: | 13.2% |

COMPARATIVE EXAMPLE 1

A film having a total thickness of 7.8 μm was produced as described in Example 1. In contrast to Example 1, an isotactic polypropylene from Borealis with the name HB 311 F was now employed, with the following composition: 99.5% by weight of polypropylene and 0.45% by weight of Irganox 1010 and 0.0075% by weight of Ca stearate.

The isotactic polypropylene had a chain isotacticity index, measured by $^{13}$C-NMR spectroscopy, after triad analysis of 93.8%, with 91.3% being due to the mm triad, 5.0% to the mr triad and 3.7% to the rr triad. The isotacticity determined by means of mmmm pentad was 86.7%. The isotactic polypropylene had a chlorine content of <5 ppm and an ash content of 22 ppm. The n-heptane-soluble content of the polypropylene was 4.2% (isotactic content PP iso 95.8%). The mean molecular weight Mn was 76,950 g/mol and Mw was 314,600 g/mol (measured by GPC), corresponding to a molecular weight distribution Mw/Mn of 4.09. The melt flow index MFI (230° C. and 2.16 kp) was 2.35 g/10 min, and the melting point was 160° C.

The transverse stretching temperature was increased by 2° C. to 163° C. The other production conditions were unchanged compared with Example 1.

COMPARATIVE EXAMPLE 2

A film having a total thickness of 4.6 μm was produced as described in Comparative Example 1.

Only the production conditions were changed as follows:

| | | |
|---|---|---|
| Extrusion: | Temperatures | 248° C. |
| | Temperature of the take-off roll: | 92° C. |
| Longitudinal stretching: | Preheating temperature: | 127° C. |
| | Longitudinal stretching temperature: | 140° C. |
| | Longitudinal stretching ratio: | 4.5 |
| Transverse stretching: | Temperature: | 161° C. |
| | Transverse stretching ratio: | 9.6 |
| Setting: | Temperature: | 135° C. |
| | Convergence: | 13.2% |

The films produced in this way had the properties listed in the table.

What is claimed is:

1. A biaxially oriented film having at least one layer comprising polypropylene, characterized in that the polypropylene has a chain isotacticity index, measured by $^{13}$C-NMR spectroscopy (triad method), of at least 95%, an isotactic pentad fraction, measured by $^{13}$C-NMR spectroscopy, in the range of 85–95%, and a n-heptane-insoluble content of at least 97%, and in that the transverse shrinkage of the film (depending on the film thickness d) satisfies the following formula:

<4.5 μm transverse shrinkage at 140° C. maximum 6.5% Δ shrinkage at 140° C.–shrinkage at 120° C.=<3.5%    d:

4.5–12 μm transverse shrinkage at 140° C. maximum 5.5% Δ shrinkage at 140° C.–shrinkage at 120° C.=<3.0%

>12–20 μm transverse shrinkage at 140° C. maximum 4.5% Δ shrinkage at 140° C.–shrinkage at 120° C.=<2.5%.

2. The film according to claim 1, characterized in that the longitudinal shrinkage of the film (depending on the film thickness d) satisfies the following formula:

<4.5 μm longitudinal shrinkage at 140° C. maximum 8.0%, and longitudinal shrinkage at 120° C. maximum 5.5%, and    d:

4.5–12 μm longitudinal shrinkage at 140° C. maximum 6.5%, and longitudinal shrinkage at 120° C. maximum 4.5%, and ≧12–20 μm longitudinal shrinkage at 140° C. maximum 5.5%, and longitudinal shrinkage at 120° C. maximum 4.0%,.

3. The film according to claim 1, characterized in that the film having a thickness of <4.5 μm has a transverse shrinkage of 2.0–5.5% at 140° C. and of <1.5% at 120° C.

4. The film according to claim 3, characterized in that the film has a longitudinal shrinkage of 4–7% at 140° C. and of 2.0–4.5% at 120° C.

5. The film according to claim 1, characterized in that the film having a thickness of 4.5–12 μm has a transverse shrinkage of 1.5–4.5% at 140° C. and of ≧1.2% at 120° C.

6. The film according to claim 5, characterized in that the film has a longitudinal shrinkage of 3.5–6.0% at 140° C. and of 1.5–4.0% at 120° C.

7. The film according to claim 1, characterized in that the film having a thickness of ≧12–20 μm has a transverse shrinkage of 1.0–4.0% at 140° C. and of ≦1.0% at 120° C. 1.0% at 120° C.

8. The film according to claim 7, characterized in that the film has a longitudinal shrinkage of 3.0–5.0% at 140° C. and of 1.0–3.5% at 120° C.

9. The film according to claim 1, characterized in that the polypropylene has an Mw/Mn of 2–8.

10. The film according to claim 9, wherein the polypropylene has an Mw/Mn of 4–7.

11. The film according to claim 1, characterized in that the polypropylene has a melting point of 160–170° C.

12. The film according to claim 11, wherein the polypropylene has a melting point of 162–167° C.

13. The film according to claim 1, characterized in that the polypropylene has a chlorine content of a maximum of 5 ppm; and an ash content of a maximum of 35 ppm.

14. The film according to claim 13, wherein the polypropylene has a chlorine content of about 0.5 ppm to about 3 ppm, and an ash content of about 10 ppm to about 30 ppm.

15. The film according to claim 1, further comprises a top layer of propylene homopolymer on at least one side of the film.

16. The film according to claim 15, characterized in that the propylene homopolymer whose chain isotacticity index, measured by $^{13}$C-NMR spectroscopy (triads), is at least 94%, and has an n-heptane-insoluble content of ≧95%.

17. The film according to claim 16, wherein said propylene homopolymer has a chain isotacticity index, measured by $^{13}$C-NMR spectroscopy (triads), from 99.5% to 98%.

18. The film according to claim 13, which comprises a top layer of propylene homopolymer on both sides of the film.

19. The film according to claim 1, characterized in that the film has been metallized on one or both of its surfaces.

20. A capacitor containing a film according to claim 1.

21. The capacitor according to claim 20, wherein said film is employed as a dielectric.

22. The film according to claim 1, wherein the polypropylene has a chain isotacticity index, measured by $^{13}$C-NMR spectroscopy (triad method), of about 95.5% to about 98%, an isotactic pentad fraction, measured by $^{13}$C-NMR spectroscopy, of about 87% to about 92%, and a n-heptane-insoluble content of about 1% by weight to about 2% by weight.

23. The film according to claim 1, wherein the layer further comprises at least one additive selected from the group consisting of a neutralizer and a stabilizer.

24. The film according to claim 23, wherein said neutralizer is selected from the group consisting of dihydrotalcite, calcium stearate, calcium carbonate and their mixtures in an amount from 0.001 to 0.5% by weight based on the weight of the layer, and said stabilizer is selected from the group consisting of pentaerythrityl tetrakis-3-(3.5-tert-butyl-4-dydroxy-phenyl)propionate and 1.3.5-trimethyl-2.4.6-tris-(3.5-di-tert-butyl-4-hydroxybenzyl) benzene in an amount from 0.05 to 0.6% by weight based on the weight of the layer.

25. A process for the production of a polypropylene film according to claim 1, which comprises the step of coextruding layers of the film and the step of orientation of the film, wherein the orientation in the longitudinal direction is carried out with a longitudinal stretching ratio of from 4 to 8, and the orientation in the transverse direction is carried out with a transverse stretching ratio of from 6 to 10.

26. The process according to claim 25, wherein the coextrusion step further comprises the step of taking-off the film in the temperature range from 30 to 120° C., and the orientation step further comprises, prior to performing the orientation, the step of preheating the film from 110 to 150° C.

27. The process according to claim 25, characterized in that the film has been corona- or flame-treated on one or both surfaces and has a surface tension of from 34 to 50.

28. The process according to claim 25, wherein the orientation in the longitudinal direction is carried out with a longitudinal stretching ratio of from 4.5 to 6.5, and the orientation in the transverse direction is carried out with a transverse stretching ratio of from 7 to 9.5.

29. The process according to claim 25, wherein the longitudinal stretching temperature is in the range from 120 to 160° C. and the transverse stretching temperature is in the range from 140 to 170° C.

30. The process according to claim 25, wherein the film has a surface tension of from 36 to 45 mN/m.

* * * * *